United States Patent
Hwang

(10) Patent No.: US 11,825,311 B2
(45) Date of Patent: Nov. 21, 2023

(54) METHOD AND DEVICE OF CHECKING INTEGRITY OF PACKET USING TRUST FIELD IN WIRELESS DISTRIBUTED COMMUNICATION SYSTEMS

(71) Applicant: ELECTRONICS AND TELECOMMUNICATIONS RESEARCH INSTITUTE, Daejeon (KR)

(72) Inventor: Hyun Gu Hwang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 51 days.

(21) Appl. No.: 17/538,980

(22) Filed: Nov. 30, 2021

(65) Prior Publication Data
US 2023/0115264 A1    Apr. 13, 2023

(30) Foreign Application Priority Data
Oct. 7, 2021 (KR) .................. 10-2021-0133114

(51) Int. Cl.
*H04W 12/106* (2021.01)
*H04W 12/0431* (2021.01)
*H04B 17/318* (2015.01)

(52) U.S. Cl.
CPC ..... *H04W 12/106* (2021.01); *H04W 12/0431* (2021.01); *H04B 17/318* (2015.01)

(58) Field of Classification Search
CPC ................ H04W 12/106; H04W 12/0431
See application file for complete search history.

(56) References Cited

U.S. PATENT DOCUMENTS

| | | | | |
|---|---|---|---|---|
| 8,315,387 B2* | 11/2012 | Kanter | ............... | H04L 9/0852 380/256 |
| 8,732,464 B2* | 5/2014 | Lai | ............. | H04L 9/3213 713/168 |
| 9,141,823 B2* | 9/2015 | Dawson | ............. | H04L 9/00 |
| 10,069,801 B1* | 9/2018 | Singhal | ............. | H04L 63/0428 |
| 10,243,802 B2* | 3/2019 | Erdmann | ............. | H04L 41/12 |
| 10,326,803 B1* | 6/2019 | Haney | ............. | H04L 63/30 |
| 11,531,773 B2* | 12/2022 | Graf | ............. | G06F 21/6245 |
| 11,626,996 B2* | 4/2023 | Campagna | ............. | H04L 9/0822 713/168 |

(Continued)

FOREIGN PATENT DOCUMENTS

KR    1020120052404 A    5/2012
KR    1020190101305 A    8/2019

*Primary Examiner* — Viral S Lakhia
(74) *Attorney, Agent, or Firm* — Rabin & Berdo, P.C.

(57) ABSTRACT

A method of checking the integrity of a wireless distributed communication packet using a trust field in a wireless distributed communication system may comprise: allowing a first terminal to acquire a trust-field-generation-specific secret key of a second terminal; allowing the second terminal to generate a trust field utilizing all bits to be transmitted to the first terminal; allowing the second terminal to generate a first packet using the trust field and all the bits to be transmitted; allowing the second terminal to transmit the first packet to the first terminal; and allowing the first terminal to check the integrity of the first packet using the trust-field-generation-specific secret key and the trust field included in the first packet.

8 Claims, 9 Drawing Sheets

(56) References Cited

U.S. PATENT DOCUMENTS

| | | | |
|---|---|---|---|
| 2010/0211787 A1* | 8/2010 | Bukshpun | H04L 9/14 380/255 |
| 2015/0172314 A1* | 6/2015 | Mononen | H04L 63/0815 726/8 |
| 2016/0142263 A1* | 5/2016 | Erdmann | H04W 8/005 455/41.2 |
| 2017/0034190 A1* | 2/2017 | May | H04L 63/1416 |
| 2019/0065757 A1* | 2/2019 | Graf | G06F 21/577 |
| 2020/0320227 A1* | 10/2020 | Sadjadpour | G06F 21/6218 |
| 2020/0367157 A1* | 11/2020 | Kim | H04W 52/02 |
| 2022/0101326 A1* | 3/2022 | Kim | H04L 63/0464 |
| 2022/0321332 A1* | 10/2022 | Linton | G06F 21/6245 |
| 2023/0036694 A1* | 2/2023 | Coughlan | G06Q 20/38215 |

\* cited by examiner

FIG. 2

| HEADER (4) | SOURCE ADDRESS (8) | DATA FIELD (20) | TRUST FIELD (8) |

(a)

| HEADER (4) | SOURCE ADDRESS (8) | DATA FIELD (12) | TRUST FIELD (8) | CRC (8) |

(b)

| HEADER (4) | SOURCE ADDRESS (8) | DATA FIELD (4) | TRUST FIELD (8) | CRC (16) |

| HEADER (4) | SOURCE ADDRESS (8) | DATA FIELD (2) | TRUST FIELD (8) |

(a)

| HEADER (4) | SOURCE ADDRESS (8) | DATA FIELD (60) | TRUST FIELD (8) |

(b)

METHOD AND DEVICE OF CHECKING INTEGRITY OF PACKET USING TRUST FIELD IN WIRELESS DISTRIBUTED COMMUNICATION SYSTEMS

CROSS-REFERENCE TO RELATED APPLICATIONS

This application claims priority to Korean Patent Application No. 10-2021-0133114, filed on Oct. 7, 2021, with the Korean Intellectual Property Office (KIPO), the entire contents of which are hereby incorporated by reference.

BACKGROUND

1. Technical Field

Exemplary embodiments of the present disclosure relate to a method of verifying the integrity of a packet having a very small number of bits in a wireless distributed communication system and, more specifically, to a method and device for a terminal of a wireless distributed system to check the integrity of a packet not using a cyclic redundancy check (CRC) but using a reliability field.

2. Related Art

Wireless distributed communication is communication in which terminals share and use radio resources by themselves without a control station. It is difficult to verify the reliability of a packet received in such wireless distributed communication. Accordingly, public trust communication, public trust packets, and public trust fields are used in existing technology.

A public trust packet is a wireless distributed communication packet and includes a public trust field for confirming reliability. Communication using such a public trust packet is referred to as public trust communication. The public trust field enables a trusted institution designated from a wireless distributed communication system to confirm the trust of a wireless distributed communication packet. A point to be noted here is that checking the trust of a packet in the wireless distributed communication does not confirm the trust of a terminal itself that has transmitted the packet. Although packets received in the wireless distributed communication are marked with source addresses, it must be checked for each packet whether the packet is really delivered from the corresponding address.

In general, a trust field in the wireless distributed communication is designed to be almost impossible to replicate. As an example, in the international standard ISO/IEC 4005-2, which is synchronous wireless distributed drone communication, a trust field has a value changing every slot time, and thus even if an illegal drone receives the trust field, this trust field is a value applied only to the past slot that has already been received. When an illegal drone duplicates the trust field and transmits the packet, a relevant trust check system may recognize that this packet is an unreliable packet. As described above, the operation in which the trust field changes over time is essential because basically all nearby users can receive the packet transmitted in the wireless distributed communication. As described above, various methods are well known as a method of generating a trust field changing over time.

In synchronous wireless distributed communication, a terminal may transmit a packet including a trust field using a simple information tone channel. The terminal may form a packet using tone signals in the information tone channel, and the number of bits constituting the packet may be very small, about 33 bits or 40 bits.

For example, when a drone or a smartphone with a built-in wireless distributed communication modem collects information from peripheral devices, the peripheral devices may transmit or receive packets using the information tone channel. In this case, the peripheral devices using the information tone channel may be made very inexpensively. This is because the information tone channel expresses one bit by using on-off keying modulation, one bit simply meaning "1" if there is a tone signal and "0" if there is no tone signal. Accordingly, a producer can greatly reduce the production cost of the wireless distributed communication terminal by using the tone channel having a simple modulation/demodulation structure.

However, in general, the terminal performs a cyclic redundancy check (CRC) to check whether there is an error in a packet. However, when the terminal transmits a packet with a very small number of bits in the information tone channel, it is difficult to include the CRC in the packet if the number of information bits to be transmitted is large compared to the size of the packet. Therefore, there is a need for another method of checking whether a packet is erroneous.

SUMMARY

Accordingly, exemplary embodiments of the present disclosure are provided to substantially obviate one or more problems due to limitations and disadvantages of the related art.

A technical problem to be solved by the present disclosure is to verify the integrity of a packet with a very small number of bits in a wireless distributed communication system. That is, conventionally, in general, a terminal may verify the integrity of a packet using a cyclic redundancy check (CRC) but cannot perform integrity verification on a relatively short packet that does not include the CRC.

Exemplary embodiments of the present disclosure provide a method of verifying the integrity of a relatively short packet with no CRC when a terminal transmits or receives the corresponding packet.

Exemplary embodiments of the present disclosure also provide an integrity verification device capable of effectively verifying the integrity of a packet with no CRC in the described above wireless distributed communication.

According to a first exemplary embodiment of the present disclosure, a method of checking the integrity of a wireless distributed communication packet using a trust field in a wireless distributed communication system may comprise: allowing a first terminal to acquire a trust-field-generation-specific secret key of a second terminal; allowing the second terminal to generate a trust field utilizing all bits to be transmitted to the first terminal; allowing the second terminal to generate a first packet using the trust field and all the bits to be transmitted; allowing the second terminal to transmit the first packet to the first terminal; and allowing the first terminal to check the integrity of the first packet using the trust-field-generation-specific secret key and the trust field included in the first packet.

The operation of allowing the second terminal to generate a trust field may further use current time information including a slot number in which the first packet is transmitted.

The operation of allowing the second terminal to generate a trust field may comprise generating a trust field for checking the integrity of the first packet when a first number of bits, which is the number of bits to be transmitted, is greater than or equal to a second number of bits of the trust field.

The operation of allowing the second terminal to generate a trust field may comprise: allowing a trust field generator including a trust bit generator and a pseudo noise (PN) generator including a shift register to receive bits to be transmitted by the PN generator and output PN codes; allowing the trust bit generator to initialize trust bits using a number of PN code outputs necessary for trust bit initialization in the PN codes; and allowing the trust bit generator to update the trust bits using all of the remaining PN codes, which are not used for the trust bit initialization, after the trust bits are initialized.

The operation of allowing the trust bit generator to update the trust bits may comprise an operation of allowing the trust bit generator to update the trust bits using an exclusive OR bit operation.

The operation of allowing the first terminal to check the integrity of the first packet may comprise: generating a trust field using the trust-field-generation-specific secret key of the second terminal and bits of the first packet except for the trust field; and determining that the first packet is intact when the generated trust field matches the trust field included in the first packet.

The operation of generating a trust field using the trust-field-generation-specific secret key of the second terminal and bits of the first packet except for the trust field may further use current time information including a slot number in which the first packet is received.

The operation of allowing the first terminal to check the integrity of the first packet may comprise measuring the reception power of the first packet and checking the integrity of the first packet when the reception power is greater than or equal to a first threshold value.

The measuring of the reception power of the first packet may be performed in subslots greater than a predetermined second threshold value for determining the presence of a tone signal in a tone channel that uses on-off keying modulation.

The operation of allowing the first terminal to check the integrity of the first packet may comprise determining whether a packet header value of the first packet is included in predefined values and checking the integrity of the first packet when the packet header value is included in the predefined values.

The operation of allowing the first terminal to check the integrity of the first packet may comprise determining whether a source address included in the first packet is a communication target and checking the integrity of the first packet when the source address included in the first packet is the communication target.

According to a second exemplary embodiment of the present disclosure, a packet integrity check device using a trust field in a wireless distributed communication system may comprise: a pseudo noise (PN) generator having a shift register and configured to output one PN code for each input transmission bit to be transmitted from a second terminal to a first terminal; and a trust bit generator having a number of PN code inputs greater than or equal to the default number of bits preset for the trust field and including a plurality of registers sequentially updated each time a PN value is generated from the number of bits greater than the default number of bits of the trust field, wherein the first terminal checks the integrity of the first packet using a pre-acquired trust-field-generation-specific secret key of the second terminal and a trust field of a first packet received from the second terminal.

The trust field may be generated by the second terminal utilizing all bits to be transmitted to the first terminal, and the first packet may be generated using the trust field and all the bits to be transmitted.

The second terminal may generate the trust field using the trust-field-generation-specific secret key of the second terminal, a current time, and a slot number in which the first packet is transmitted.

The second terminal may update the values of some registers of the trust bit generator a plurality of times through an exclusive OR bit operation.

The first terminal may generate the trust field by using the pre-acquired trust-field-generation-specific secret key of the second terminal, the first packet received from the second terminal, and the reception time of the first packet and may determine that the first packet is intact when the generated trust field matches the trust field included in the first packet.

According to the present disclosure, it is possible for terminals of a wireless distributed communication system to effectively perform an integrity check on a packet that does not include a cyclic redundancy check (CRC).

Also, according to the present disclosure, it is possible to provide a method of effectively checking whether a packet is erroneous when a packet having a very small number of bits is transmitted in an information tone channel or when the CRC cannot be included in the packet because the number of information bits to be transmitted is large compared to the size of the packet.

Also, according to the present disclosure, it is possible for a terminal transmitting a tone signal using an on-off keying modulation technique to effectively perform an integrity check on a packet using a trust field included in the packet.

BRIEF DESCRIPTION OF DRAWINGS

FIG. 2 is an exemplary diagram of a 40-bit wireless distributed communication packet structure that can be employed in a method of checking the integrity of a wireless distributed communication packet according to an embodiment of the present disclosure.

FIG. 6 is an exemplary diagram of wireless distributed communication packets of various lengths that can be employed in the integrity check method of the wireless distributed communication packet according to an embodiment of the present disclosure.

DETAILED DESCRIPTION OF THE EMBODIMENTS

Figure 1:
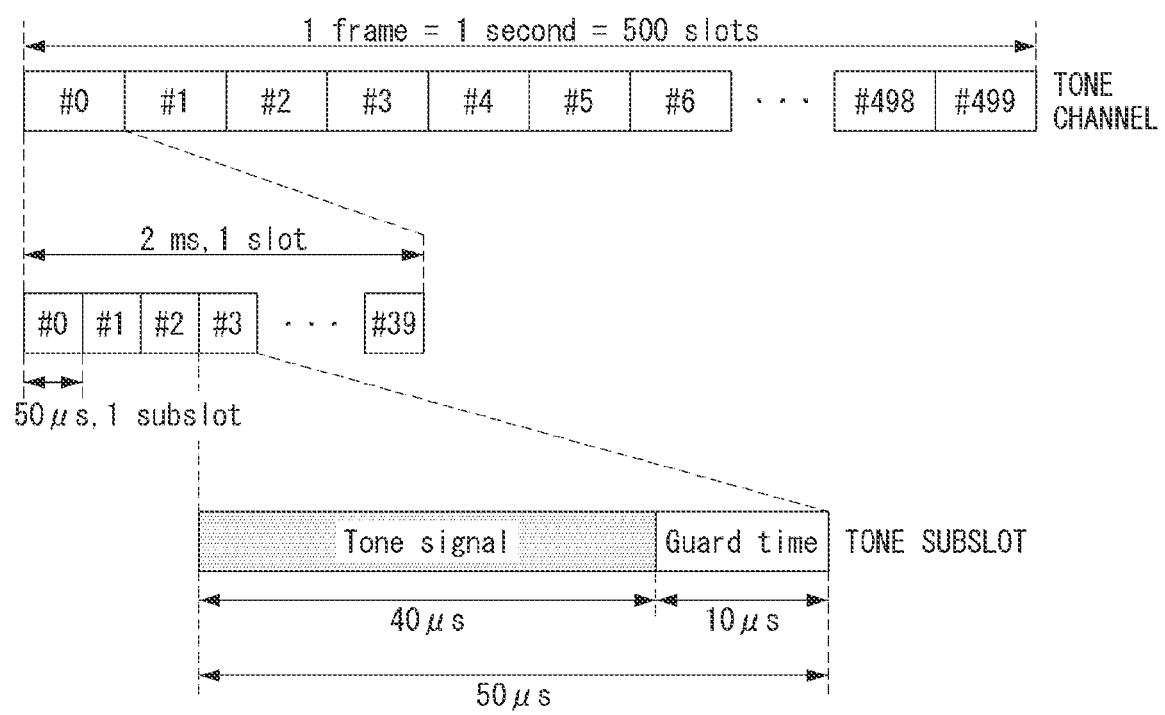
FIG. 1 is an exemplary diagram of a slot structure and a frame structure of a tone channel using an on-off keying modulation scheme that can be employed in a method of checking the integrity of a wireless distributed communication packet according to an embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

The present disclosure relates to a method of performing an integrity check on a packet with no cyclic redundancy check (CRC) in a wireless distributed communication system. Since distributed wireless communication is mainly many-to-many communication, one terminal cannot trust other terminals. Meanwhile, in a wireless distributed communication system, a terminal may transmit information using a tone channel. Since the tone channel is simply a channel for transmitting a tone signal using an on-off keying modulation technique, a terminal using the tone channel can be produced at a very low price.

FIG. 1 is an exemplary diagram of a slot structure and a frame structure of a tone channel using an on-off keying modulation scheme that can be employed in a method of checking the integrity of a wireless distributed communication packet according to an embodiment of the present disclosure.

As shown in FIG. 1, one frame of the tone channel is one second and is composed of a total of 500 slots #0 to #499. One slot of the tone channel is composed of a total of subslots #0 to #39. The length of one slot is 2 ms, and the length of one subslot is 50 μs. One tone subslot is composed of a tone signal of 40 μs and a guard time of 10 μs.

One subslot may represent one bit and may be regarded as "1" when a tone signal is present and "0" when the tone signal is not present. That is, the tone channel may be used in the on-off keying modulation scheme. Accordingly, when one terminal uses one slot, the terminal can transmit a 40-bit packet.

FIG. 2 is an exemplary diagram of a 40-bit wireless distributed communication packet structure that can be employed in a method of checking the integrity of a wireless distributed communication packet according to an embodiment of the present disclosure.

As shown in (a) of FIG. 2, the wireless distributed communication packet may be composed of a 4-bit packet header, an 8-bit source address, a 20-bit data field, and an 8-bit trust field. Also, as shown in (b) of FIG. 2, the packet may be composed of a 4-bit packet header, an 8-bit source address, a 12-bit data field, an 8-bit trust field, and an 8-bit CRC. Also, as shown in (c) of FIG. 2, the packet may be composed of a 4-bit packet header, an 8-bit source address, a 4-bit data field, an 8-bit trust field, and a 16-bit CRC.

As shown in FIG. 2, in a packet including a CRC, the number of bits in the data field is reduced by the number of bits of the CRC. Accordingly, in the wireless distributed communication, the terminal may transmit more data bits by not using the CRC.

However, when the CRC is not included in the packet as shown in (a) of FIG. 2, there is no way to check the integrity of the packet. That is, one terminal cannot know whether an error bit is present in a 40-bit packet transmitted by another terminal. Thus, in this embodiment, as shown in (a) of FIG.

2, the integrity of a packet that does not include a CRC is checked using a trust field included in the packet.

Figure 3:
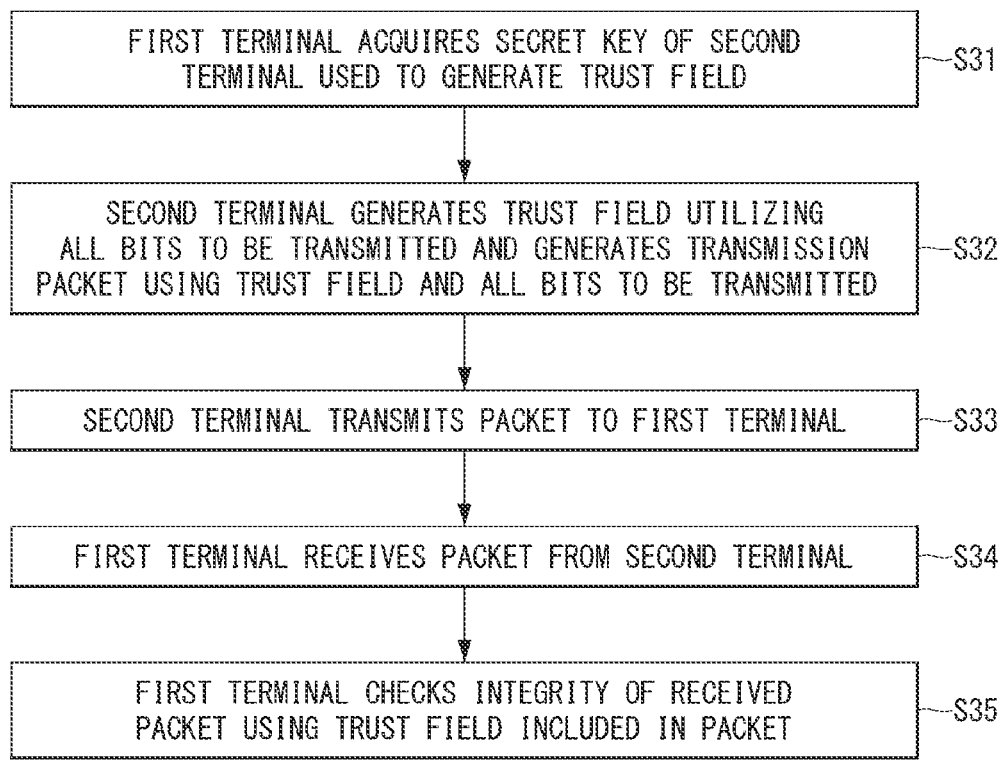
FIG. 3 is a flowchart of a method of checking the integrity of a wireless distributed communication packet according to an embodiment of the present disclosure.

FIG. 3 is a flowchart of a method of checking the integrity of a wireless distributed communication packet (hereinafter also referred to as a "packet integrity check method") according to an embodiment of the present disclosure.

Referring to FIG. 3, in the packet integrity check method, a first terminal acquires a secret key of a second terminal used to generate a trust field (S31).

The second terminal generates the trust field using all bits to be transmitted to the first terminal. Also, the second terminal generates a first packet using all the bits to be transmitted and the generated trust field (S32).

Subsequently, the second terminal transmits the first packet to the first terminal (S33). Also, the first terminal receives the first packet from the second terminal (S34).

Then, the first terminal checks the integrity of the first packet using the trust field included in the first packet (S35).

The above-described first to fifth operations of the packet integrity check method will be described in detail as follows.

First, a process in which a first terminal acquires a secret key (refer to S31 of FIG. 3) will be described with reference to FIGS. 4, 5A, and 5B as follows. The secret key refers to a key used by a second terminal to generate a trust field.

Figure 4:
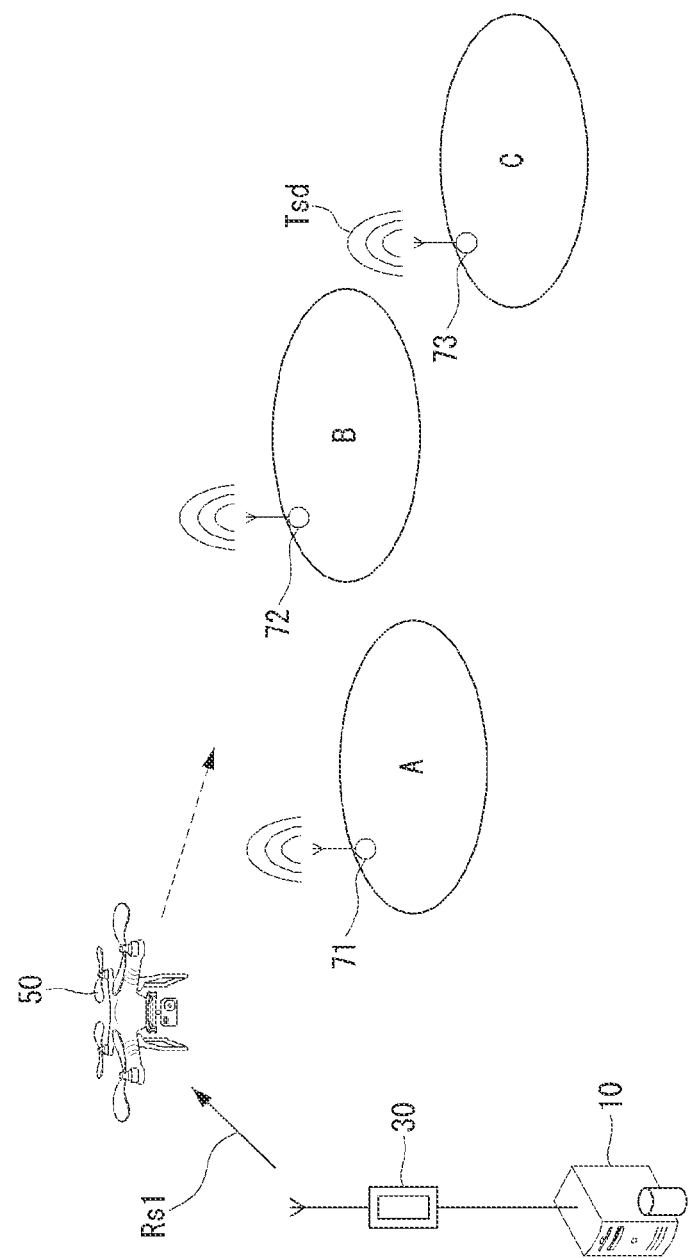
FIG. 4 is an exemplary diagram illustrating a process of acquiring a trust-field-generation-specific secret key of wireless distributed terminals that can be employed in an integrity check method of a wireless distributed communication packet according to an embodiment of the present disclosure.

FIG. 4 is an exemplary diagram illustrating a process of acquiring a trust-field-generation-specific secret key of wireless distributed terminals that can be employed in an integrity check method of a wireless distributed communication packet according to an embodiment of the present disclosure.

In general, since only a trust check system has secret keys of distributed terminals in a wireless distributed communication system, only the trust check system may perform a trust check on a trust field. Therefore, a first terminal needs to acquire the trust-field-generation-specific secret key of a second terminal by inquiring to an institution that manages a secret key of the second terminal, a trust check system, or the like. Accordingly, in this embodiment, a drone having a built-in wireless distributed modem may be used so that the first terminal acquires the secret key of the second terminal.

As shown in FIG. 4, while flying over place A, place B, and place C in sequence, a drone 50 with a built-in wireless distributed modem collects information, that is, sensor data Tsd, from sensors at the places or wireless distributed terminals 71, 72, and 73.

At this time, the drone 50 may acquire trust-field-generation-specific secret keys to be provided to the wireless distributed terminals 71, 72, and 73 located at place A, place B, and place C from a secret key management institution 30 of the trust check system 10 before flying over place A, place B, and place C (Rs1). The acquired secret keys may be provided to the wireless distributed terminals 71, 72, and 73 while the drone 50 is flying. The secret keys provided to the wireless distributed terminals 71, 72, and 73 may be at least partially the same or different from each other.

Second, so that the first terminal can check packet integrity using a trust field in the future, the second terminal generates the trust field by using all bits to be transmitted and generates a transmission packet using all the bits to be transmitted and the trust field (see S32 of FIG. 3). Accordingly, trust field generation methods that can be employed in this embodiment are illustrated in FIGS. 5A and 5B.

Figure 5A:
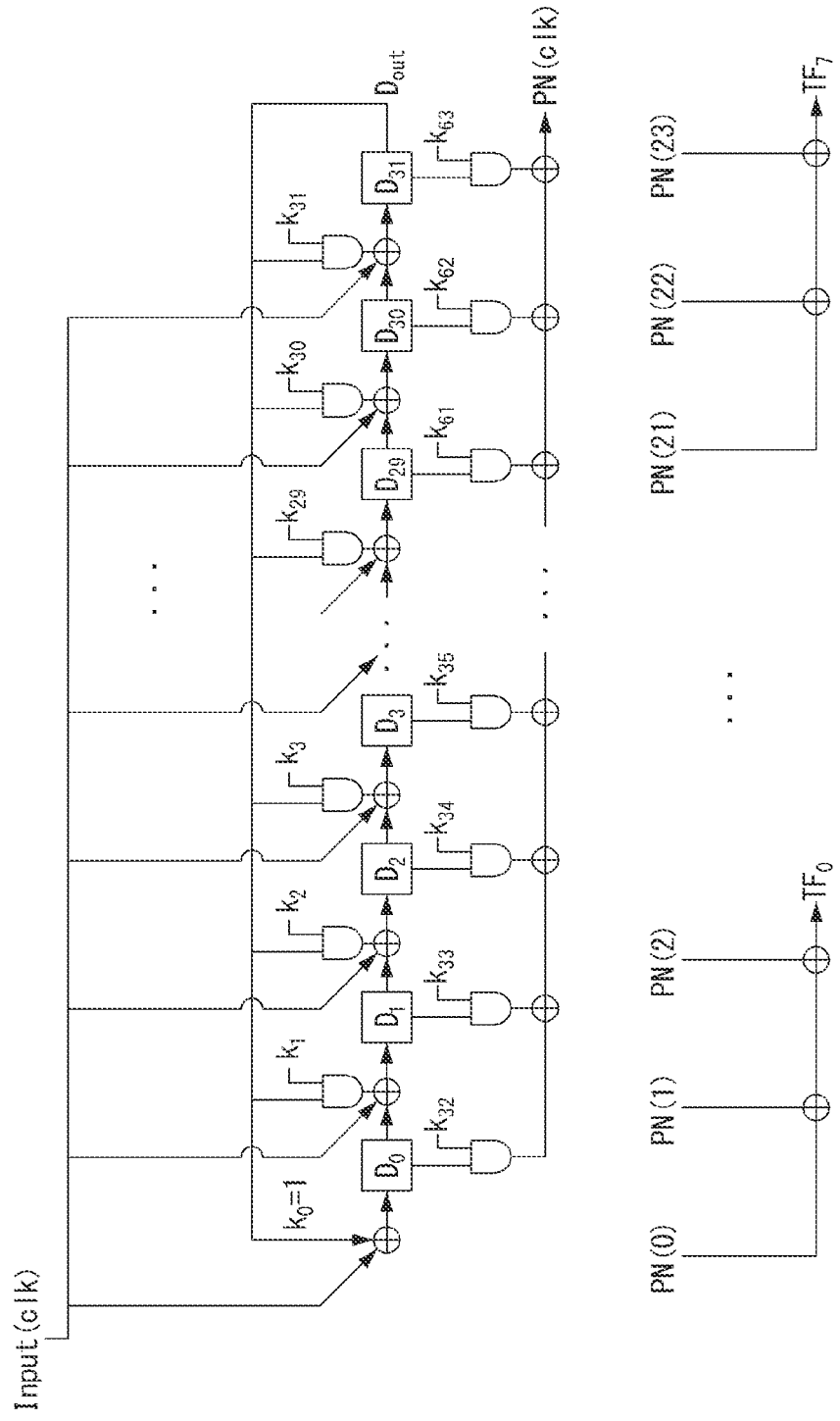
FIGS. 5A and 5B are exemplary diagrams illustrating the trust field generation methods that can be employed in the integrity check method of the wireless distributed communication packet according to an embodiment of the present disclosure.
Figure 5B:
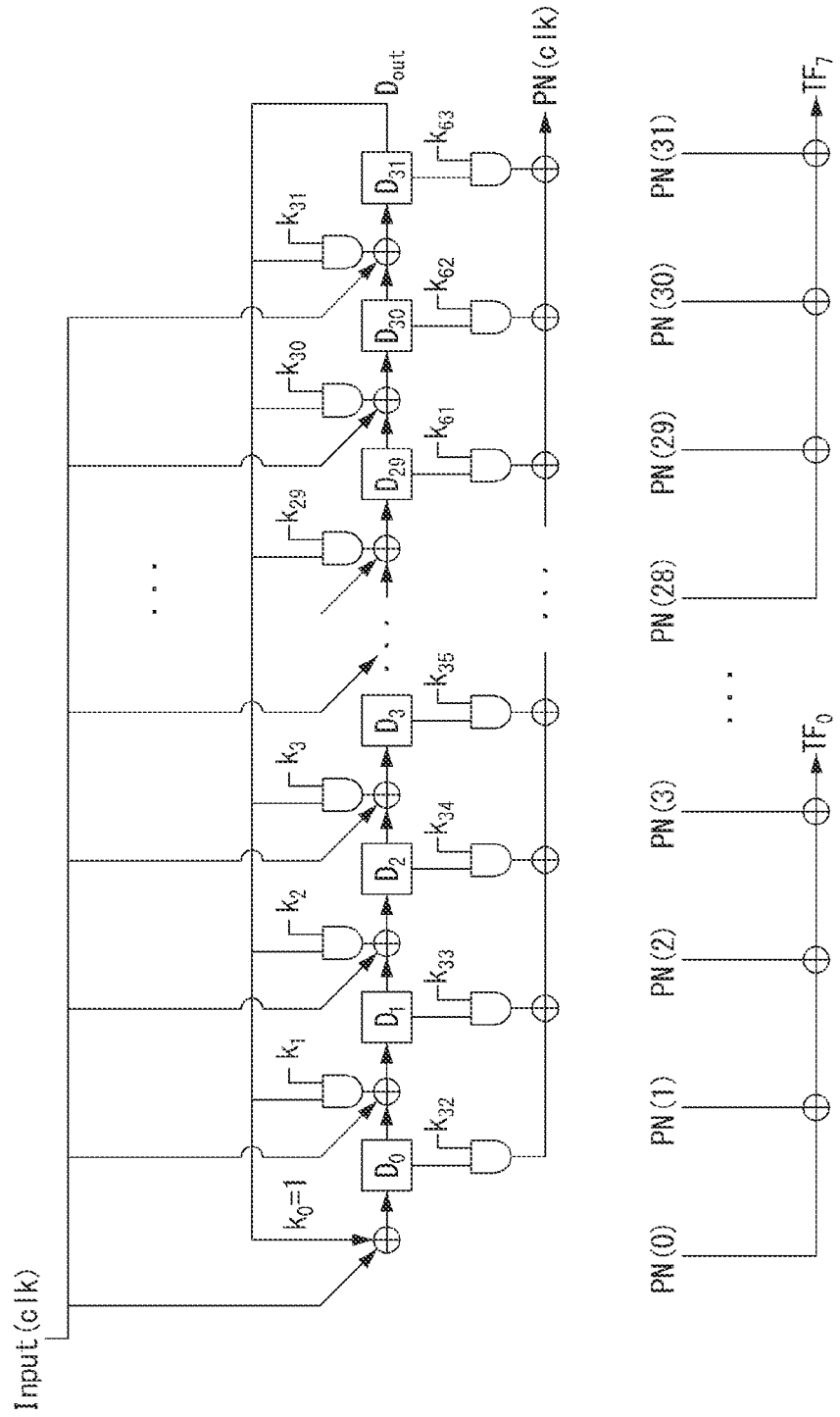

FIGS. 5A and 5B are exemplary diagrams illustrating the trust field generation methods that can be employed in the integrity check method of the wireless distributed communication packet according to an embodiment of the present disclosure.

The trust field generation method shown in FIG. 5A is expressed as Equation 1 below $D_0(\text{clk}+1) = D_{31}(\text{clk}) \text{ xor input}(\text{clk})$ $D_i(\text{clk}+1) = D_{i-1}(\text{clk}) \text{ xor } (D_{31}(\text{clk}) \text{ and } k_i) \text{ xor input}(\text{clk}), i=1,\ldots,31$ $\text{TF} = PN(3n) \text{ xor } PN(3n+1) \text{ xor } PN(3n+2), n=0,\ldots,7$ [Equation 1]

In Equation 1, "clk" denotes clock, $D_0(\text{clk})$ denotes the value of register 0 in clk, $PN(\text{clk})$ is a pseudo noise (PN) value in clk, and $\text{Input}(\text{clk})$ is the clkth bit to be transmitted as an external input in clk. Also, "xor" denotes an exclusive OR bit operation, and "and" denotes an AND bit operation. Also, k is a 64-bit secret key.

The initial value of the above-described resister D may be configured as Equation 2 below.

$[D_7(0), D_6(0), \ldots, D_0(0)] = [SA_7, SA_6, \ldots, SA_0]$ $[D_{16}(0), D_6(0), \ldots, D_8(0)] = [s_8, s_7, \ldots, s_0]$ $[D_{22}(0), D_{21}(0), \ldots, D_{17}(0)] = [f_5, f_4, \ldots, f_0]$ $[D_{27}(0), D_{26}(0), \ldots, D_{23}(0)] = [M_4, M_3, \ldots, M_0]$ $[D_{31}(0), D_{30}(0), \ldots, D_{28}(0)] = [H_3, H_2, \ldots, H_0]$ [Equation 2]

In Equation 2, SA denotes an 8-bit source address of a terminal, s denotes a slot number ranging from 0 to 499, f denotes a frame number ranging from 0 to 59, M denotes the time ranging from 0 to 59 minutes, and H denotes the time ranging from 1 to 12 hours.

Meanwhile, the trust field generation method shown in FIG. 5B is expressed as Equation 3 below.

$D_0(\text{clk}+1) = D_{31}(\text{clk}) \text{ xor input}(\text{clk})$ $D_i(\text{clk}+1) = D_{i-1}(\text{clk}) \text{ xor } (D_{31}(\text{clk}) \text{ and } k_i) \text{ xor input}(\text{clk}), i=1,\ldots,31$ $\text{TF}_n = PN(4n) \text{ xor } PN(4n+1) \text{ xor } PN(4n+2) \text{ xor } PN(4n+3)$ [Equation 3]

As described above, the trust field generation methods of FIGS. 5A and 5B are basically the same as each other but have the following differences in generating the bits of the trust field.

That is, in the trust field generation method such as the circuit configuration of FIG. 5A, 24 bits are used to generate a trust field. Meanwhile, in the method of FIG. 5B, 32 bits are used to generate a trust field. Accordingly, when composing a packet without a CRC as shown in FIG. 2A, the integrity of the first 24 bits may be checked, and the integrity of the remaining 8 bits cannot be checked, as shown in FIG. 5A.

In order to check integrity using a trust field as described above, in this embodiment, as shown in FIG. 5B, a trust field is generated by using a trust field generator having a number of PN code inputs greater than or equal to the number of trust bits preset for a packet and utilizing all bits to be transmitted.

In particular, the second terminal uses the current time including the slot number when calculating or generating a trust field. Also, in this embodiment, the second terminal generates a packet by adding, to all the bits to be transmitted, a trust field generated based on all the bits.

Third and fourth, a process in which the second terminal transmits a pre-generated packet to the first terminal (refer to S33 of FIG. 3) and a process in which the first terminal receives a packet from the second terminal (refer to S34 of FIG. 3) will be described in detail as follows.

Referring back to FIG. 4, the drone 50 serving as a relay may deliver sensor data of the first terminal to the second terminal and may deliver a secret key or a packet of the second terminal to the first terminal. Here, the second terminal may correspond to a trust check system 10 or a secret key management institution 30. Also, the second terminal is a terminal in any one of place A, place B, and place C and may be a terminal different from the first terminal.

Also, when the drone 50 arrives at place A, a first wireless distributed terminal 71 including a sensor or a sensor device may receive a packet including a trust field capable of a packet integrity check for the drone 50.

Also, when the drone 50 arrives at place A, the drone 50 may receive sensor data Tsd or a packet transmitted by the first wireless distributed terminal 71. Such a packet receiving process may be performed in the same manner also by the wireless distributed terminal located at place B or place C.

Fifth, a process in which the first terminal checks the integrity of the previously received packet using the trust field included in the packet (refer to S35 of FIG. 3) will be described in detail as follows.

For example, the first terminal calculates a trust field using a received packet in the same manner as in the trust field generation method of FIG. 5A and checks whether the calculated trust field is the same as the trust field included in the corresponding packet. In this case, the first terminal may calculate the trust field utilizing a slot number in which the packet is received.

The packet integrity check method utilizing the trust field has been described above. Hereinafter, a method of generating a trust field when the number of bits in a packet changes will be described below. That is, the structure shown in FIG. 5B may generate a trust field capable of checking the integrity of a packet only when the number of transmission bits is 32 and the number of bits of the trust field is 8. However, the second terminal may select several packet lengths depending on the situation.

FIG. 6 is an exemplary diagram of wireless distributed communication packets of various lengths that can be employed in the integrity check method of the wireless distributed communication packet according to an embodiment of the present disclosure. (a) of FIG. 6 shows the configuration of a first packet that uses 20 bits, and (b) of FIG. 6 shows the configuration of a second packet that uses 80 bits.

As shown in (a) of FIG. 6, the first packet is composed of a 2-bit packet header, an 8-bit source address, a 2-bit data field, and an 8-bit trust field. Also, as shown in (b) of FIG. 6, the second packet is composed of a 4-bit packet header, an 8-bit source address, a 60-bit data field, and an 8-bit trust field. The terms "first packet" and "second packet" are used to distinguish packets of different lengths, and the second packet may be referred to as the first packet, and vice versa.

Accordingly, the first terminal venerates an 8-bit trust field using 12 transmission bits when receiving the first packet and generates an 8-bit trust field using 72 transmission bits when receiving the second packet. As described above, in this embodiment, the trust field generation method as shown in FIG. 7 may be used to generate trust fields for various packet lengths.

Figure 7:
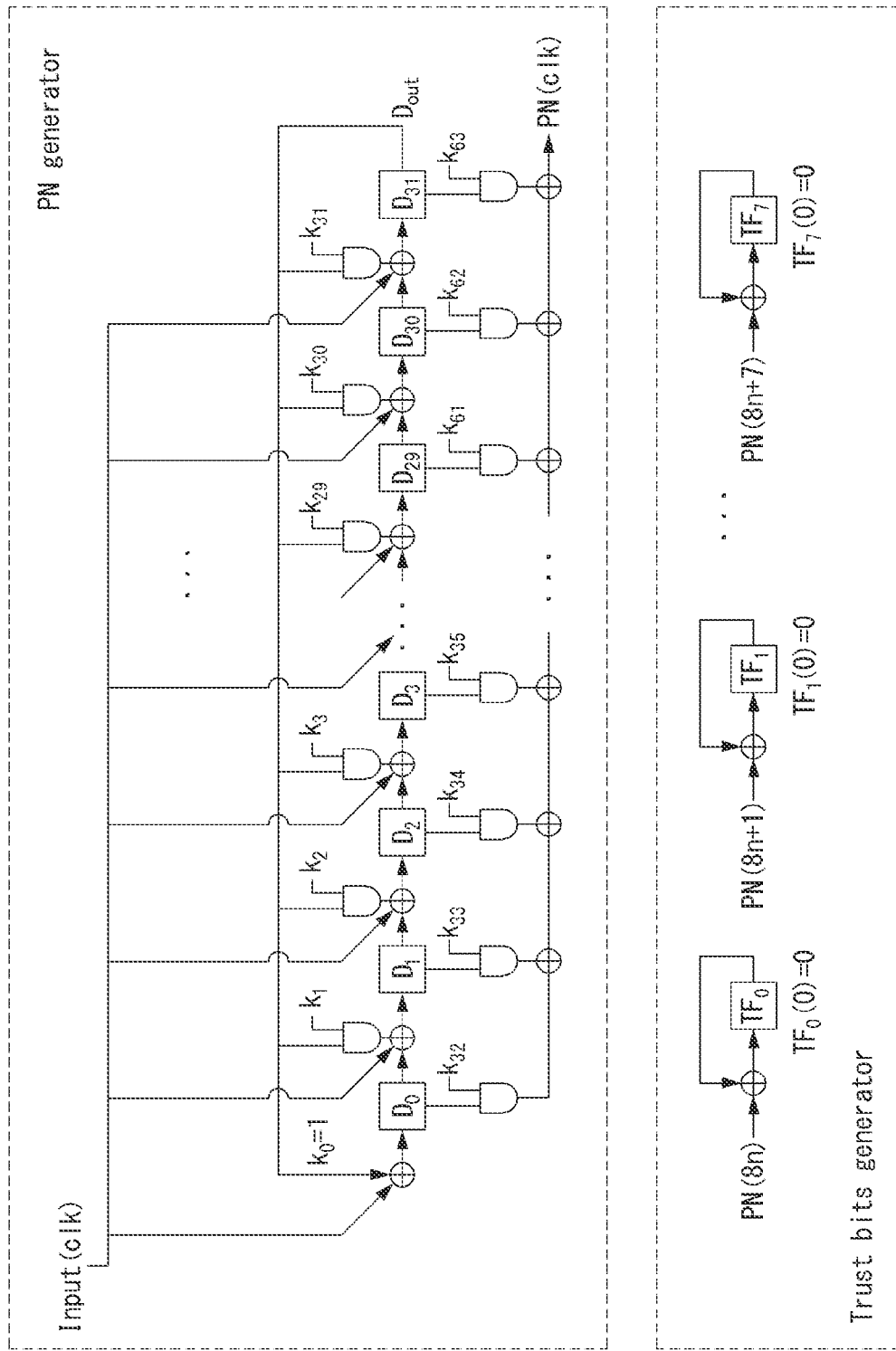
FIG. 7 is an exemplary diagram illustrating a trust field generation process for generating a trust field capable of an integrity check for various packet lengths in an integrity check method of a wireless distributed communication packet according to an embodiment of the present disclosure.

FIG. 7 is an exemplary diagram illustrating a trust field generation process for generating a trust field capable of an integrity check for various packet lengths in an integrity check method of a wireless distributed communication packet according to an embodiment of the present disclosure.

In this embodiment, the length of the trust field of the packet is assumed to be 8 bits, and the number of transmission bits is assumed to be greater than or equal to 8 bits. That is, the second terminal, which is a transmission-side terminal for transmitting a packet, uses the trust field generator of FIG. 7 to generate a trust field that can check the integrity of the packet when the number of transmission bits is greater than or equal to 8 bits.

Referring to FIG. 7, the trust field generator includes a PN generator and a trust bit generator.

The PN generator outputs one PN code or PN value for each input transmission bit. The structure of the PN generator may be basically the same as the structure shown in FIG. 5B and may be expressed in the same manner as in Equation 3 above.

The trust bit generator may have a number of PN code inputs greater than or equal to 8 bits. This is different from the structure shown in FIG. 5B. The trust bit generator shown in FIG. 5B has a fixed number of PN code inputs.

In the trust bit generator, the x-th register $TF_x$ has an initial value of "0" and is continuously updated whenever $PN(8n+x)$ is generated. Here, $TF_x(0)$ is "0," and x and n are integers greater than or equal to 0. When $TF_x(n)$ is updated to $PN(8n+x)$, it may be expressed as $TF_x(n+1)$. This is expressed as Equation 4 below.

$$TF_x(n+1)=TF_x(n)\char`\^ PN(8n+x), x=0, \ldots ,7 \quad \text{[Equation 4]}$$

In Equation 4, ^ denotes an exclusive OR bit operation.

Using the trust bit generator of this embodiment, the trust field for the first packet shown in (a) of FIG. 6 may be obtained as in Equation 5 below.

$$TF_0(2)=PN(0)\char`\^ PN(8);$$

$$TF_1(2)=PN(1)\char`\^ PN(9);$$

$$TF_2(2)=PN(2)\char`\^ PN(10);$$

$$TF_3(2)=PN(3)\char`\^ PN(11);$$

$$TF_4(1)=PN(4);$$

$$TF_5(1)=PN(5);$$

$$TF_6(1)=PN(6);$$

$$TF_7(1)=PN(7); \quad \text{[Equation 5]}$$

In Equation 5, $TF_0$, $TF_1$, $TF_2$, and $TF_3$ are updated with PN twice, and $TF_4$, $TF_5$, $TF_6$, and $TF_7$ are updated with PN once.

Also, using the trust bit generator of this embodiment, the trust field for second packet shown in (b) of FIG. 6 can be obtained as in Equation 6 below.

$$TF_0(8)=PN(0)\char`\^ PN(8)\char`\^ PN(16)\char`\^ \ldots \char`\^ PN(64);$$

$$TF_1(8)=PN(1)\char`\^ PN(9)\char`\^ PN(17)\char`\^ \ldots \char`\^ PN(65);$$

$$TF_2(8)=PN(2)\char`\^ PN(10)\char`\^ PN(18)\char`\^ \ldots \char`\^ PN(66);$$

$$TF_3(8)=PN(3)\char`\^ PN(11)\char`\^ PN(19)\char`\^ \ldots \char`\^ PN(67);$$

$$TF_4(8)=PN(4)\char`\^ PN(12)\char`\^ PN(20)\char`\^ \ldots \char`\^ PN(68);$$

$$TF_5(8)=PN(5)\char`\^ PN(13)\char`\^ PN(21)\char`\^ \ldots \char`\^ PN(69);$$

$$TF_6(8)=PN(6)\char`\^ PN(14)\char`\^ PN(22)\char`\^ \ldots \char`\^ PN(70);$$

$$TF_7(8)=PN(7)\char`\^ PN(15)\char`\^ PN(23)\char`\^ \ldots \char`\^ PN(71); \quad \text{[Equation 6]}$$

In Equation 6, all of $TF_x$ are updated with PN eight times.

As described above, the trust field generator as shown in FIG. 7 may generate a trust field capable of verifying the integrity of a packet regardless of the length of the packet.

In one embodiment of the trust field generator, the PN generator may include a plurality of first AND gates, a plurality of exclusive OR bit operation units $D_0$ to $D_{31}$, a plurality of second. AND gates, and a plurality of AND bit operation units. Also, the trust bits generator may include a plurality of registers $TF_0$ to $TF_7$.

That is, in a wireless distributed communication system, a packet integrity check device for checking the integrity of a packet using a trust field includes a trust field generator, and the trust field generator includes a PN generator and a trust bit generator. Here, the PN generator is configured as a shift register and outputs one PN code for each input transmission bit to be transmitted from the second terminal to the first terminal. Also, the trust bit generator has a number of PN code inputs greater than or equal to the default number of bits preset for the trust field and includes a plurality of registers or a plurality of shift registers that are sequentially updated each time a PN value is generated from the number of bits greater than the default number of bits of the trust field.

Here, the first terminal checks the integrity of the first packet by using the pre-acquired trust-field-generation-specific secret key of the second terminal and the trust field of the first packet received from the second terminal. More specifically, the first terminal generates the trust field by using the pre-acquired trust-field-generation-specific secret key of the second terminal, the first packet received from the second terminal, and the reception time of the first packet and may determine that the first packet is intact when the generated trust field matches the trust field included in the first packet.

Also, the second terminal may generate the trust field using the trust-field-generation-specific secret key and the current time and the slot number of the trust bit generator that are used to generate the trust field. Also, the second terminal may update the values of some registers of the trust bit generator a plurality of times through an exclusive OR bit operation. The trust field may be generated by the second terminal by utilizing all bits to be transmitted to the first terminal, and the first packet may be generated with all bits to be transmitted and the trust field.

The above-described trust field generator including the trust bit generator and the PN generator using the shift registers has a very simple structure and thus can operate quickly while consuming a small amount of power.

Next, points to be taken into account when the first terminal checks packet integrity will be described.

The packet integrity check method according to this embodiment aims to mainly operate for a packet having a small number of bits. Therefore, in general, the number of bits in the trust field is also small. Because the number of bits in the trust field is small, a terminal may sometimes determine that a packet is intact even when the packet has an error. For example, when a terminal using an 8-bit trust field receives noise 256 (=$2^8$) times on average, the terminal may determine that the packet is intact at least once.

There are two ways to prevent such incorrect determination. First, by measuring the reception power of a packet, the terminal checks the integrity of the packet when the measured reception power of the packet is greater than or equal to a first threshold value and determines that the packet is not intact when the measured reception power is less than the first threshold value.

Meanwhile, in a tone channel that uses on-off keying modulation, the terminal measures the reception power of the packet in only subslots greater than a preset second threshold value that determines the presence of a tone signal among subslots constituting the packet. This is because there is no received signal power in a time region having no signals.

Second, known information such as a source address and a packet header is utilized. That is, when a packet header value is not predefined or when a received source address is not a communication target of a first terminal, the first terminal may determine that the corresponding packet is not intact and may not check the integrity of the packet.

As described above, this embodiment enables a terminal to check the integrity of a short packet using a trust field in a wireless distributed communication system. In particular, it is possible to provide a trust field generation method and device through which wireless distributed terminals, which are cost sensitive, can check the integrity of a packet while reducing hardware implementation burden.

Figure 8:
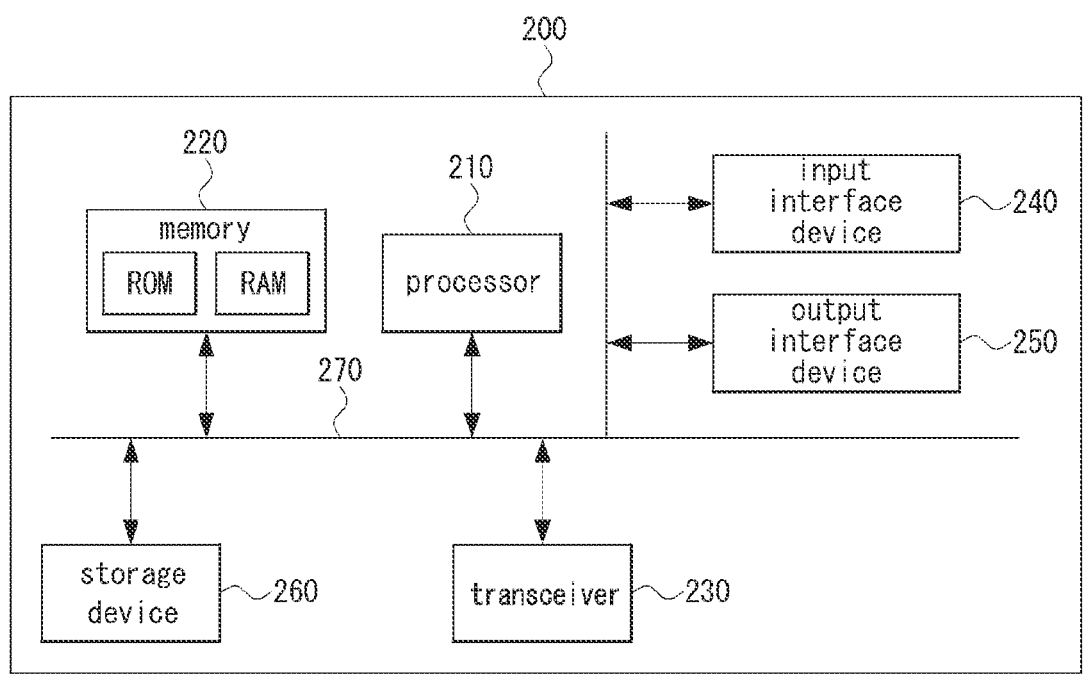
FIG. 8 is a schematic block diagram of a configuration of a communication node or a terminal capable of being quipped with the packet integrity check device of FIG. 7.

FIG. 8 is a schematic block diagram of a configuration of a communication node or a terminal capable of being quipped with the packet integrity check device of FIG. 7.

Referring to FIG. 8, a terminal or a communication node 200 corresponding to a first terminal or a second terminal ay include at least one processor 210, a memory 220, and a transceiver 230 connected to a network to perform communication. Also, the communication node 200 may further include an input interface device 240, an output interface device 250, a storage device 260, etc. Each elements included in the communication node 200 may be connected to each other by a bus 270 to perform communication.

The processor 210 may execute a program command stored in at least one of the memory 220 and the storage device 260. The program command may include a first command to generate a trust field by utilizing all bits to be transmitted to the first terminal, a second command to generate a first packet with all the bits to be transmitted and the trust field, a third command to transmit the first packet to the first terminal, etc. Also, the program command may include a fifth command to acquire a trust-field-generation-specific secret key of the second terminal, a sixth command to receive the first packet from the second terminal, a seventh command to check the integrity of the first packet using the trust field included in the first packet, and the like.

Also, the processor 210 may include a PN generator that outputs one PN value for each input transmission bit for transmission bits to be transmitted in wireless distributed communication and a trust bit generator that has a number of PN code inputs greater than or equal to the default number of bits preset for a trust field and that includes a plurality of registers repeatedly, cyclically, or sequentially updated in a preset trust bit number range whenever a PN value is generated from the number of bits greater than the default number of bits of the trust field.

The above-described processor 210 may refer to a central processing unit (CPU), a graphics processing unit (GPU), or a dedicated processor on which the methods according to embodiments of the present disclosure are performed. Each of the memory 220 and the storage device 260 may be configured as at least one of a volatile storage medium and a non-volatile storage medium. For example, the memory 220 may be configured as at least one of a read-only memory (ROM) and a random-access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of checking an integrity of a wireless distributed communication packet using a trust field in a wireless distributed communication system, the method comprising operations of:

allowing a first terminal to acquire a trust-field-generation-specific secret key of a second terminal;

allowing the second terminal to generate a trust field utilizing all bits to be transmitted to the first terminal;

allowing the second terminal to generate a first packet including the trust field and all the bits to be transmitted;

allowing the second terminal to transmit the first packet to the first terminal; and allowing the first terminal to check an integrity of the first packet using the trust-field-generation-specific secret key and the trust field included in the first packet;

wherein the operation of allowing the second terminal to generate the trust field comprises operations of:

allowing a trust field generator including a trust bit generator and a pseudo noise (PN) generator including a shift register to receive bits to be transmitted by the PN generator and output PN codes;

allowing the trust bit generator to initialize trust bits using a number of PN code outputs necessary for trust bit initialization in the PN codes; and allowing the trust bit generator to update the trust bits using all of the remaining PN codes, which are not used for the trust bit initialization, after the trust bits are initialized.

2. The method of claim 1, wherein the operation of allowing the trust bit generator to update the trust bits comprises an operation of allowing the trust bit generator to update the trust bits using an exclusive OR bit operation.

3. The method of claim 1, wherein the operation of allowing the first terminal to check the integrity of the first packet comprises operations of:

generating a trust field using the trust-field-generation-specific secret key of the second terminal and bits of the first packet except for the trust field; and determining that the first packet is intact when the generated trust field matches the trust field included in the first packet.

4. The method of claim 3, wherein the operation of generating a trust field using the trust-field-generation-specific secret key of the second terminal and bits of the first packet except for the trust field further uses current time information including a slot number in which the first packet is received.

5. The method of claim 1, wherein the operation of allowing the first terminal to check the integrity of the first packet comprises measuring a reception power of the first packet and checking the integrity of the first packet when the reception power is greater than or equal to a first threshold value.

6. The method of claim 5, wherein the measuring of the reception power of the first packet is performed in subslots having a greater than a predetermined second threshold value for determining a presence of a tone signal in a tone channel that uses on-off keying modulation.

7. The method of claim 1, wherein the operation of allowing the first terminal to check the integrity of the first packet comprises determining whether a packet header value of the first packet is included in predefined values and checking the integrity of the first packet when the packet header value is included in the predefined values.

8. The method of claim 1, wherein the operation of allowing the first terminal to check the integrity of the first packet comprises determining whether a source address included in the first packet is a communication target and checking the integrity of the first packet when the source address included in the first packet is the communication target.

* * * * *